United States Patent [19]

Pulver

[11] 4,045,075
[45] Aug. 30, 1977

[54] AUTOMOBILE BODY FRAME AND ENVELOPE CONSTRUCTION

[76] Inventor: Donald W. Pulver, 1616 Trolist Drive, Pittsburgh, Pa. 15241

[21] Appl. No.: 641,785

[22] Filed: Dec. 18, 1975

[51] Int. Cl.² .............................................. B62D 21/00
[52] U.S. Cl. ............................... 296/28 J; 280/106 R
[58] Field of Search .................... 280/106 R, 106 T; 296/28 R, 28 J

[56] References Cited

U.S. PATENT DOCUMENTS

| 1,581,931 | 4/1926 | Lamplugh | 296/28 J |
| 3,616,872 | 11/1971 | Taylor | 296/28 R |

FOREIGN PATENT DOCUMENTS

| 748,379 | 4/1933 | France | 296/28 J |

Primary Examiner—Philip Goodman
Attorney, Agent, or Firm—David H. Semmes; Warren E. Olsen

[57] ABSTRACT

A lightweight vehicle body and envelope construction for an elongated wheelbased vehicle of relatively narrow track where the aspect ratio for wheelbase to track is between approximately 2:1 and 3:1. The lightweight vehicle approach taught herein relies upon a central truss member within the passenger compartment which extends longitudinally and symmetrically between the wheel mounting positions as the main longitudinal bending load bearing member of the vehicle.

21 Claims, 7 Drawing Figures

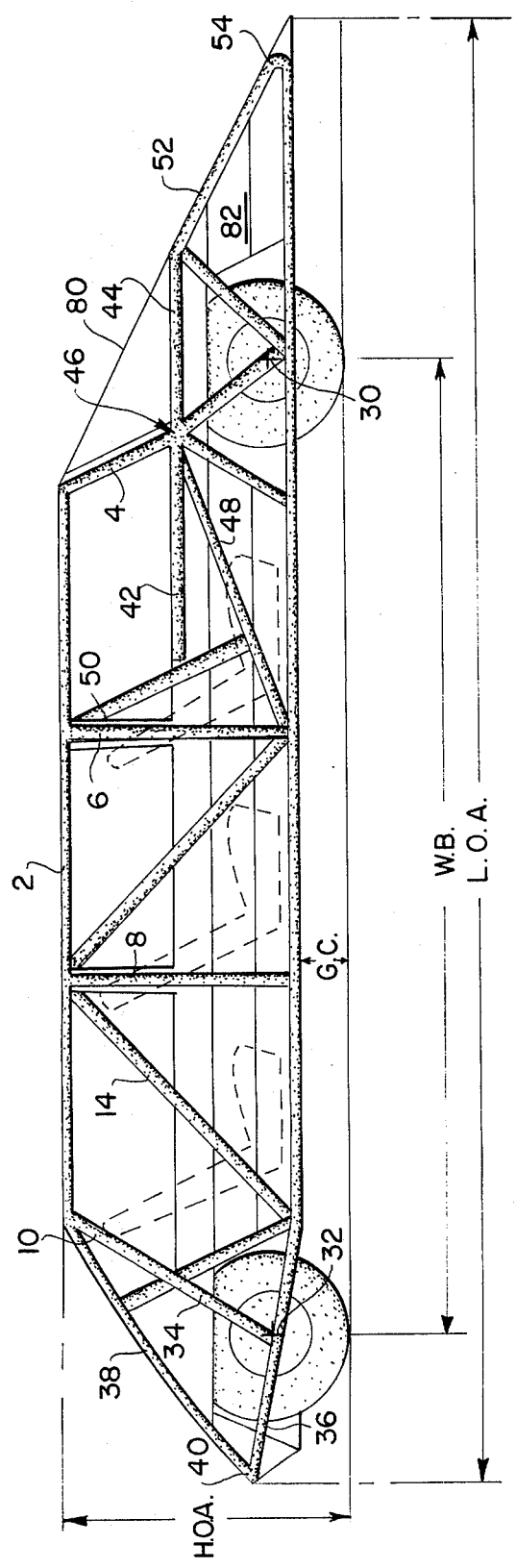
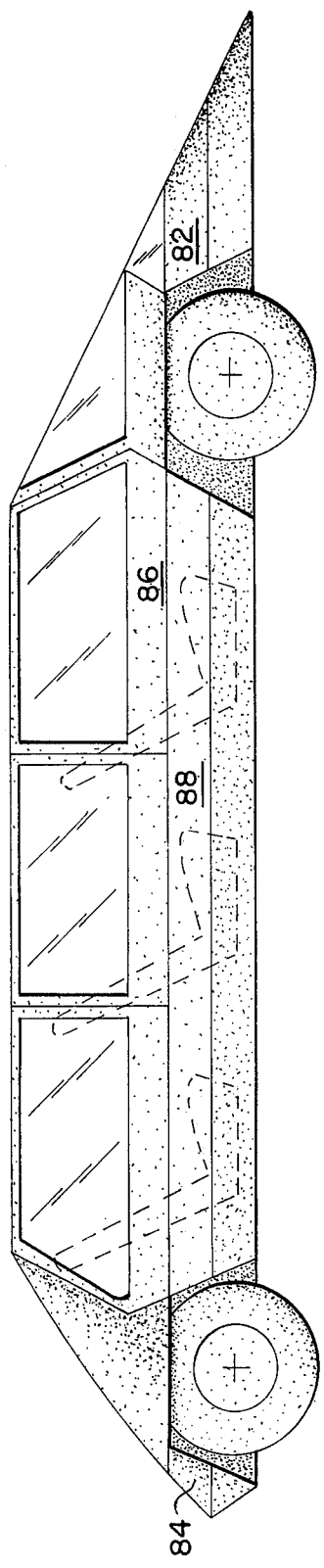
FIG.2
FIG.4

AUTOMOBILE BODY FRAME AND ENVELOPE CONSTRUCTION

BACKGROUND OF THE INVENTION

1. Field of the Invention

It is a primary object of my invention to provide a vehicular frame structure which provides overall a level of riding comfort, passenger and luggage capacity, comparable to the American "full size" cars of the late 1960s while remaining in a class of vehicles which has commonly come to be known as the sub-compact car. In this respect ride characteristics are tremendously enhanced over the small wheelbase sub-compact cars as are presently known today through the provision of a frame structure which allows a tremendously elongated wheelbase with respect to a narrow track which is on the order of the sub-compact cars.

According to present engineering practices, sub-compact cars maintain low weight characteristics through minimizing wheelbase and track to define an overall light weight vehicle. However, the reduction in wheelbase necessitated by available vehicular frame structures seriously detracts from the smooth ride characteristics heretofore available with full size cars having longer wheelbases. In recognition of the fact that improved ride characteristics can only be achieved through a vehicular design which affords the maximum possible wheelbase the present invention teaches a manner of maintaining an elongated wheelbase while maintaining a minimization of weight for the overall vehicle.

An object of the invention is, therefore, to provide a very light, very low, narrow and very long wheelbased automobile frame and envelope construction in which the very long wheelbase and envelope overcome the inferior ride and capacity characteristics associated with small, short wheelbased vehicles which are commonly known as in the category of sub-compact vehicles.

In order to achieve the object of a sufficiently safe, strong and rigid frame and envelope, the present invention teaches a rigid frame structure which employs as a basic load bearing member a central member which extends between the roof and the bottom of the vehicle longitudinally through the length of the structure within the front and rear wheel assembly attachments points.

In order to achieve the objects of improved riding characteristics in a vehicle having a track of the sub-compact size, the present invention teaches a tubularized body frame where tubular aluminum is arranged primarily longitudinally in the form of a truss through the center of the automobile to permit an extremely light weight spanning of the elongated wheelbase in the lightest possible manner. According to the underlying concept of this invention the sagging or bending of the body between the wheel base, inherent in any elongated wheelbase, is precluded by the novel employment of this central truss structure without prohibitive weight penalty. According to a further feature of this invention, the transverse frame includes roll bars integrally formed with side door frames to cooperate with the or central truss assembly.

The prior art approach to light weight vehicles has uniformly employed conventional frame structures or unitized body structures which rely upon either a rectangular frame or a series of interconnected welded side body panels to supply the stiffness necessary for the body section suspended between the front and rear wheel assemblies.

For conventional vehicular designs employing shortened wheelbases, such as a sub-compact category, weight minimization has involved simply structural design with frames or unitized side body panels to minimize weight while supplying sufficient resistance to a longitudinal bending moment between the wheels.

On the contrary, the present invention contemplates a vehicular design where a central truss member supplies the main longitudinal bending load bearing function so that a lightweight vehicle with an aspect ratio for wheelbase to track of between 2:1 and 3:1 is possible.

Unlike the prior art, it is a primary purpose of the instant invention to provide a vehicle having a frontal front track and overall width on the order of sub-compact vehicles and yet having a tremendously elongated length on a much longer wheelbase than presently associated with such sub-compact vehicles. As a result of the vehicular body frame and envelope construction taught herein, weight may be minimized without sacrifice of ride characteristics inherent in the short wheelbase sub-compact vehicles presently available.

2. Description of the Prior Art

The following patents illustrate various frame structures for vehicles as known to be used in the prior art:

| | |
|---|---|
| France | 979,994 |
| Great Britain | 728,346 |
| Transport World, Jan. 7, 1950, Pages 21–23 | |
| FEIZER | 3,827,525 |
| HUSZAR | 3,806,149 |
| OLSON | 3,759,540 |
| BROYER | 3,672,718 |
| TAYLOR | 3,616,872 |
| EGGERT | 3,292,969 |
| WILFERT | 3,290,088 |
| HENRY | 3,239,234 |
| WILFERT | 2,864,646 |
| UHLENHAUT | 2,797,954 |
| MULLER | 2,668,722 |
| ROSE | 2,507,421 |
| FORD | 2,269,451 |

While a large number of chassis configurations are exampled by these above-noted references, there is not found any recognition of a structural approach for the specific presently disclosed desirability of achieving an elongated wheelbase by a central truss in a sub-compact vehicle.

France Pat. No. 979,994 illustrates a flat bed trailer construction with a tubular frame construction. However, unlike the instant disclosure the underframe taught by this reference is without recognition of a sub-compact chassis construction that allows for an extended wheelbase in a passenger vehicle by a central support member vertically and longitudinally extending within the passenger compartment.

Great Britain Pat. No. 728,346, and the corresponding U.S. Patent, to Uhlenhaut is an approach to a light weight chassis design by a triangular construction having external diagonal struts forming pyramidal stiffening members. In order to stiffen the body he employs a triangular construction on either side of the vehicle passenger compartment with biaces therein generating from nodal points 24 and 29. As such Uhlenhaut specifically dispenses with either roof braces or any type of centerline longitudinal members in complete distinction to the instant invention.

The *Transport World* article illustrates another lightweight vehicle frame approach wherein a flat horizontal underframe floor structure is relied upon for adding rigidity to a skeletal superstructure. Unlike such a conventional approach the instant invention requires no horizontal frame substructure and obtains overall longitudinal bending rigidity through a vertical and longitudinally extending frame structure that extends central within the passenger compartment.

Felzer is of interest only for his showing of a frontal frame structure. He also relies upon a total structural approach of encompassing a passenger compartment instead of employing a central main support member as in the instant invention.

The subframe approach of Huszar similarly requires a dual tubed frame on either side of the vehicle.

The chassis construction taught by Olson obtains rigidity through another form of compartmentalized horizontal floor frame, further illustrating by contrast the radical departure of the structural approach of the instant invention.

Broyer represents a lightweight and conventional wheelbase sub-compact vehicle design approach that depends upon an external configuration defined by two pyramidal frustrums. While not specific or enabling to any chassis approach, Broyer yet reflects another prior art form of reliance on external pyramidal members in contrast to the internal rigidification as taught herein.

The frame construction of Taylor includes another type of external space frame construction of tubular material to minimize weight. Similarly, the frame concept teachings of Eggert illustrates a frame construction where body panels are further used to supply rigidity to a station wagon chassis. In distinction the present invention achieves an elongated wheelbase vehicle with a relatively narrow track by relying upon an internal strut assembly extending longitudinally within the passenger space.

The patent to Wilfert is less pertinent to the state of the art of frame construction and is included to illustrate a conceptual design where rigidity is achieved through adjustment of geometrical relationships of the vehicle roof and body.

The trailer of Henry represents another common vehicle construction where a long wheelbased rigidity is desired. Henry's use of a steel channel subframe would represent a conventional approach in distinction to the inventive approach taught herein.

Wilfert illustrates a U-shaped frame concept for providing rigidity and roof support. Again, this patent is concerned with an external frame which requires at least a pair of side-by-side longitudinal members; an approach prohibitively heavy for adaptation to a vehicle with a tremendously elongated wheelbase relative to its track.

Muller and Rose each simply illustrate further frame configurations using a tubular material for minimized weight, and without further relevance to the instant invention.

Finally, the early Henry Ford patent illustrates at FIGS. 2 and 3 yet another unitized external tubular frame structure to resist twisting stresses.

While Ford also seeks as an object to isolate body panels from the structural loads on the vehicle, his approach dissimilarly relies upon an external box structure. As such any attempted elongated wheelbase development would require prohibitively heavy strengthening of both the side rails, 10, for example, in order to successfully resist the inherently increased bending loads between the axles.

In summary the prior art has not approached the creation of an elongated vehicle frame structure from an approach which purposefully relies upon a central longitudinal truss member to provide the necessary longitudinal rigidity.

Further objects, features and advantages of this invention may be appreciated with reference to the following description and drawings.

SUMMARY OF THE INVENTION

There is taught herein a vehicle body frame and envelope construction which allows for an elongated wheel-based vehicle having relatively narrow track. An underlying principle of this invention is that improved ride characteristics are directly related to the length of the wheelbase, with short wheelbase vehicles necessarily having a choppy or bumpy ride which is inversely related to the length of the wheelbase.

In order to provide a very light, very low, narrow and very long wheelbased automobile frame and envelope construction the present invention primarily achieves this result through arranging a longitudinal truss central through the passenger compartment as the main spanning element. In order to minimize weight it has been discovered that a tubular type of aluminum truss construction may provide both the lower frame construction as well as a roof support member so that the main load-bearing structure is without undue weight penalty. In addition to the main longitudinal truss the invention further provides for the transverse arrangement of frame structure which perform the function of a roll bar while further acting as door frames. In addition to the longitudinal truss member which together with the transverse tubular members supplies the main passenger enclosement, there are further provided front and rear tubular subframes for mounting suspension, engine and related components and additionally providing for a front and rear crash protection configuration.

In one embodiment of this invention the central or central longitudinal strut has at its upper spanning member a hinged attachment for a gull winged door arrangement. In this preferred embodiment the gull winged doors are mounted to the top of the central truss between respective transverse roof pillars to define the door opening. In this gull winged embodiment supplemental spanning and twisting resistance may be provided by relatively massive aluminum guard beams bolted to the tubular frame below the bottom of the gull winged door openings.

With this lightweight body frame and envelope construction sufficient structural rigidity is obtained through the longitudinal and transverse frame assemblies so that a lightweight construction may be maintained through using plastic body panels, which may be vacuum form, injection molded, or otherwise fabricated, and bolted around the frame structure to form the vehicle envelope. In this respect the body panels function simply as a shell and need only be strong and stiff enough to span between the respective tubular attachment points without necessity for functioning as a unitizing or stiffening member in the overall structure. A preferred manner of engaging these body panels with the frame structure is disclosed to include bolting or bonding these panels onto respective flanges formed upon the tubular frame.

It should be emphasized that one primary object of this invention is to provide a frame structure which allows for a sub-compact vehicle having an elongated length. For purposes of this disclosure the present invention contemplates a wheelbase of approximately 156 inches for the preferred embodiment, with a front track of 54 inches. The vehicle of the preferred embodiment furthermore is represented to have an overall length on the order of 224 inches and an overall height of 48 inches.

For comparison purposes it should be noted that a well-known sub-compact vehicle manufactured by Volkswagen and sold under the trade designation Rabbit has a front track of 54.7 inches and a wheelbase of 94.5 inches to define a vehicle having an overall length of 155.3 inches an an overall height of 55.5 inches. As such these dimensions are typical of the category of vehicles denominated sub-compact. For further reference, the Chevrolet division of General Motors produces a sub-compact vehicle sold under the trade name Chevette which has a front track of 51.2 inches, a wheelbase of 94.3 inches to define a vehicle with an overall length of 158.7 inches and an overall height of 52.3 inches.

Therefore, it can be seen quite readily that for sub-compact vehicles an aspect ratio of wheelbase to track is always on the order of less than 2:1. It should be further noted that a wheelbase of 156 inches as disclosed herein for the preferred embodiment is comparable only to the wheelbase of a vehicle manufactured by the Cadillac Motor Company and carrying a model designation Fleetwood 75 which has a wheelbase of 151.5 inches and a front track of 63.0 inches. It can be further seen that for this full size limousine vehicle this results in an aspect ratio of wheelbase to front track of less than 2.4:1.

Therefore, it can be seen that sub-compact vehicles uniformly are designed with the above-noted aspect ratios of less than 2 and even the limousine manufactured by the Cadillac Motor Company has an aspect ratio of less than 2.4:1. In distinction the present invention contemplates a sub-compact vehicle having an aspect ratio of wheelbase to track on the order of between 2:1 and 3:1 and preferrably between 2.5:1 and 3:1. The structural solution to a vehicle having this basic configuration is clearly taught herein to result from reliance upon a single meridional longitudinal truss member in order to achieve the overall configuration with a minimization of weight penalty.

BRIEF DESCRIPTION OF THE DRAWINGS

FIG. 2 is a side view of the vehicle according to a preferred embodiment of the invention;

FIG. 4 is a side view showing an overall configuration of a preferred embodiment;

DESCRIPTION OF THE PREFERRED EMBODIMENTS

Figure 1:
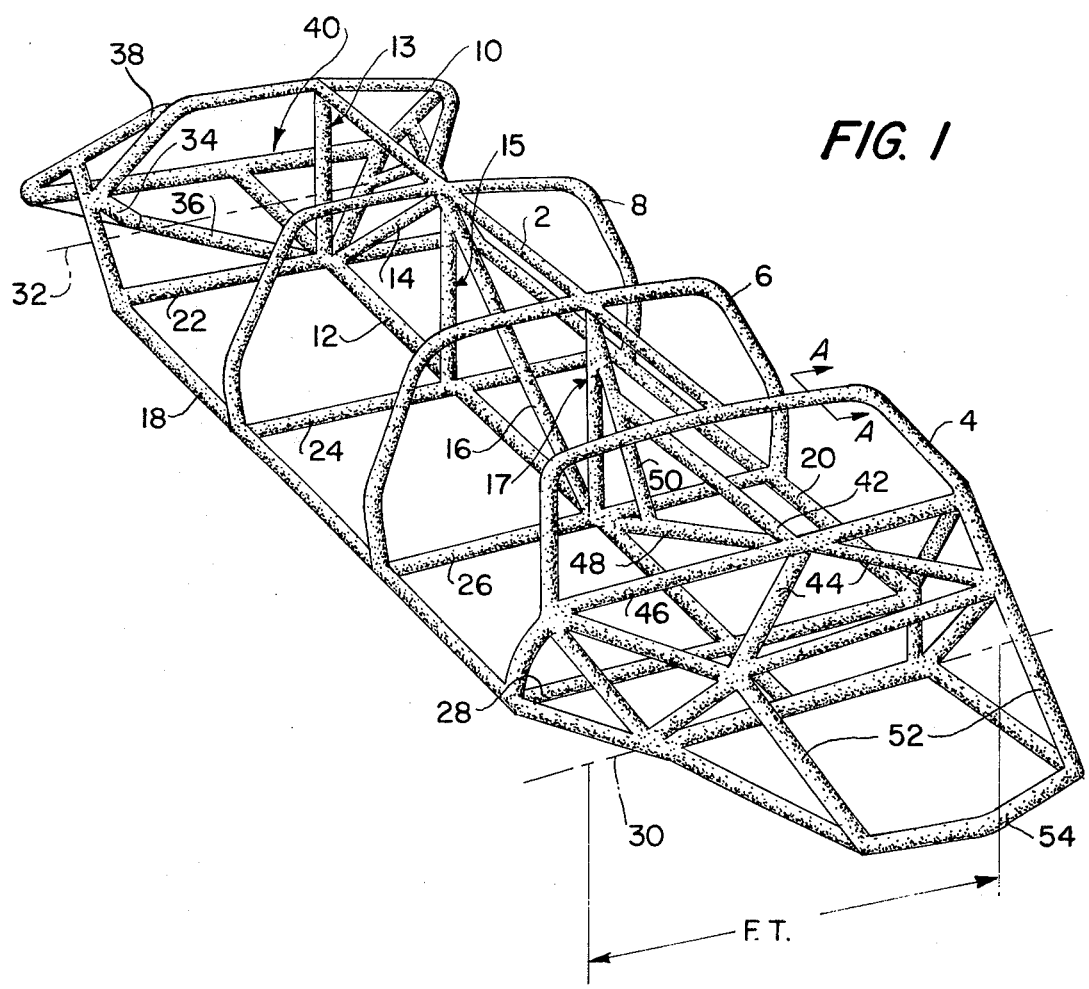
FIG. 1 is a perspective view of preferred embodiment of the invention.

FIG. 1 illustrates the essential body frame construction according to the present invention to comprise a central truss member having a longitudinally extending roof support element 2 and a bottom longitudinal strut element 12. The longitudinal frame assembly further includes a right side sill 18 and a left side sill 20 extending longitudinally on either side of the symmetrical central meridional truss assembly.

One locus for mounting a front wheel assembly is shown generally at 30 and the locus of a rear wheel assembly is illustrated with respect to this frame structure at 32. Also illustrated on the front wheel assembly axis 30 is a dimension F. T. to illustrate front wheel mounting positions, with these mounting positions conventionally used to determine the trade terminology vehicle track. As illustrated further in FIG. 2 the dimension W.B. is shown between the points 30 and 32 to define the dimension wheelbase. Additionally the overall length of the vehicle is shown in FIG. 2 as L.O.A. and the overall height of the vehicle is referenced by a dimension H.O.A.

For the preferred embodiment represented by FIGS. 1 and 2 a representative wheelbase according to the principles of this invention is approximately 156 inches and with a front track of 54 inches. Additionally according to this preferred embodiment the overall length would be on the order of 224 inches and the overall height 48 inches. As such as aspect ratio of wheelbase to front track is approximately 3:1.

The body frame and envelope construction further illustrated in FIG. 1 includes a transverse frame structure basically comprising the forward transverse roof pillar 4, a center transverse roof pillar 6 and 8, and a further rear transverse roof pillar 10. These U-shaped roof pillars are joined to the central truss member at the top longitudinal strut element 2 in a manner which will be hereinafter more particularly described.

The central truss member further includes vertical meridional struts 13, 15, 17 and diagonal central struts 14 and 16 to define a triangulated truss between the longitudinal positions of the center transverse roof pillar 6 and the rear transverse roof pillar 10. The central truss element further includes in the region between the roof pillar 6 and the forward transverse roof pillar 4 a triangulated reinforcing arrangement which includes inclined central strut 50 and inclined brace 48. As shown in this preferred embodiment there is a forward brace rod 42 extending central for juncture with the inclined central strut 50 and for further triangulated interconnection with the transverse windshield pillar 46 and the forward diagonal struts 44. The bottom central strut element 12 may extend this triangulated truss structure either to the wheel assembly points 30 or may structurally interconnect with the wheel mounting points 30 through further triangular bracing as represented at 44. The bottom strut member 12 is shown to make a rearward structural interconnection with rear transverse cross member 22 and vertical strut 13 with a further sub-frame assembly allowing for definition of the rear end configuration shown generally at 40. The rear sub-frame further includes a rear configuration strut 38 to cooperate with rear side member 34 and rear support member 36 is illustrated to interconnect with the bottom central strut 12 at a common juncture point with vertical central strut 13.

Forward of front wheel assembly mounting point 30 there is shown a front sill sub-assembly 52 which further includes a transverse member 54 with this front sub-assembly being configured for mounting of front crash protection elements.

As further shown in FIG. 1 the right side sill 18 has a structural interconnection with the central truss member through center transverse cross members 22, 24, 26, and 28. It is noted that a primary consideration of this design is minimization of weight and the right side sills comprising only tubular aluminum is a preferred embodiment primarily provide merely side crash-worthiness while the main resistance to longitudinal bending between the front and rear wheel assemblies born by the central truss. In the region between the center transverse roof pillar 6 and the forward transverse roof pillar 4 the forward brace rod 42 is shown in the preferred embodiment to extend at a level below the top central strut 2 to allow a person while driving to have unimpaired side vision. Therefore, the inclined central strut 50 together with the inclined brace strut 48 act as further supporting members of the entire central truss assembly. The essential function of the central truss is to act as a main load bearing member to resist deformation sagging of the frame between the wheels and to further provide overall structural integrity to the vehicle frame structure herein without prohibitive weight burdens as associated with conventional frame structures that require either a box frame or unitized body construction to supply rigidity in an external fashion. The central truss assembly taught according to the invention spans between the front and rear sub-assemblies in a symmetrical fashion midway between those wheel mounting positions which define the vehicle track. It is significant that this central strut assembly extends vertically from the bottom of the frame assembly to further define a central upper roof support for the vehicle body without total reliance upon a plurality of structural members external to the passenger compartment as is represented to be a conventional approach by the prior art as explained above.

Figure 3:
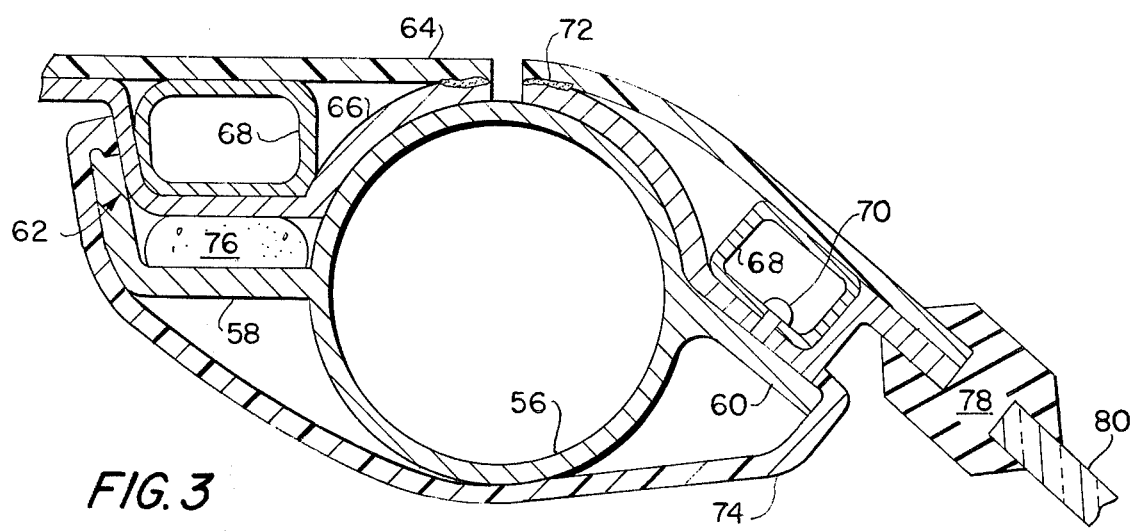
FIG. 3 is a sectional view showing a body panel mounting detail.

FIG. 3 examples the preferred mounting system for a frame structure comprised of tubular aluminum of an aircraft quality grade. As shown in FIG. 3, "tubular" element 56 includes semi-hollow shapes, such as 66, and other hollow types of aluminum, shapes, such as rectangular tubing 66. As shown in FIG. 3 a represented section A—A shows a preferred embodiment for the manufacture of a frame according to the instant invention. As shown the frame representatively consists of aircraft grade tubular aluminum 56 which further includes a first integrally formed mounting flange 60 and a second integral mounting flange 58. As illustrated in FIG. 3 the second mounting flange 58 includes a distal end projection 62 in order to facilitate detachment of element such as plastic headliner element 74. Further preferred constructional technique comprises using plastic or like lightweight body panels 64 which may be bonded either directly to the outer surface of tubing 56 or with intermediate attachment to a plastic or aluminum interior element 66. An outer body panel is further illustrated in FIG. 3 to be supported by tubular type member 68 which may be secured either to the first flange 60 or to an interior member 66 through provision of fastener 70. A windshield is schematically illustrated at 80 to be mounted through the windshield frame 78 which may be of elastomeric or other conventional material. Further illustrated in this constructional technique is a insulational or potting material 76 which may be representatively used between interconnecting structural elements. It should be noted that the lightweight body panel 64 may also be segmented at points around circumferences of the tubular frame member since there is no need for overall structural rigidity to be obtained from the body panels per se, as shown to the left of the bonding joint 72. In this respect the instant design does not require a unitized body construction with metallic body elements, but rather may simply employ lightweight body panels such as that represented at 64 as an envelope for the entire vehicle.

FIG. 2 shows in a side view a further side configuration of the preferred embodiment, and it has been indicated the top strut of the central strut 2 supplies the roof configuration with overall elongated configuration of the vehicle frame being further defined by rear configuration struts 38 which are part of the rear sub-assembly. The rear sub-assembly further includes a bumper support 40 and a rearwardly extending axle strut 36 to cooperate in a further triangulated manner with the main central truss assembly. As is further shown in FIG. 2 the configuration according to the instant invention is preferably defined at the bottom by bottom central strut element 12 which is in the same plane as the right and left side sills 18 and 20, respectively. Since the central truss defines the overall height of the vehicle passenger compartment the dimension G.C. represents the ground clearance of the frame with wheel assemblies mounted thereon and for this preferred embodiment it has been found that a ground clearance of 9 inches affords adequate clearance in view of the tremendously elongated wheelbase.

Figure 5:
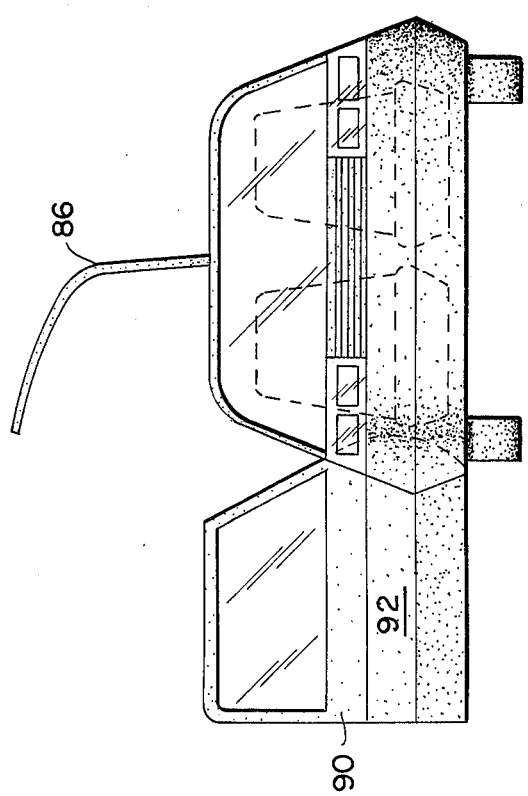
FIG. 5 is a front view of a vehicle body frame and envelope construction illustrating two door mounting configurations.

FIG. 4 represents the overall envelope of a vehicle according to the instant invention where the front sub-assembly further includes an element 82 wich is a deformable crash member at a standard bumper height above the ground. In FIG. 4 the envelope according to the vehicle construction herein may include a gull winged door 86 with an aluminum guard beam spanning above the right and left side sills 18 and 20 in the region 88. A further deformable crash element 84 may be positioned at a standard bumper height rearwardly of the vehicle in the vicinity of the bumper support element 40 in the rear subframe structure. As is further illustrated in FIG. 5 the gull winged door 86 may be conveniently hinged on the central top strut 2 for an upward pivoting between the respective transverse roof pillars illustrated in FIG. 1. As is also illustrated in FIG. 5 a middle or rear side door, which is of conventional opening is shown at 90 and may be hinged, for example, on transverse elements 6 or 8 of FIG. 1. Furthermore it is understood that all the access openings may be either of the conventional construction 90 or of the gull winged type 86 to further define the envelope of the vehicle according to the instant invention and if all or any of the side doors are of the conventional type 90 aluminum crash worthiness beams may be further provided in the space denominated 92 on FIG. 5.

Figure 6:
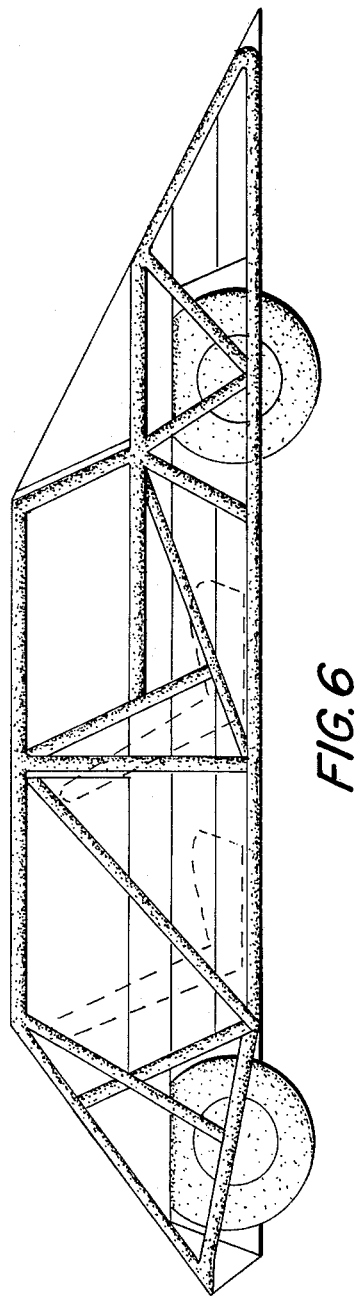
FIG. 6 is a second embodiment of the invention.

FIG. 6 shows a second embodiment of the invention for a sub-compact vehicle of slightly less elongated wheelbase. However again as shown in FIG. 6 the primary structural element is accomplished through a central truss which extends between the wheel assembly attachment points in a symmetrical fashion vertically upwards from the bottom of the vehicle frame to further define an upward roof support for the vehicle body. In this fashion even the second embodiment showing a four passenger version acquires great longitudinal rigidity through this novel central truss design without prohibitive weight penalty. In the four passenger embodiment of FIG. 6 a preferred wheelbase would be on the order of 117 inches together with a front track on the order of 54 inches to further define an aspect ration of wheelbase to track which is greater than 2:1. Therefore even in the four passenger embodiment there is taught a vehicle frame and envelope construction which allows for improved riding characteristics over presently known sub-compact frame structures having an aspect ratio of wheelbase to track of less than 2:1.

Figure 7:
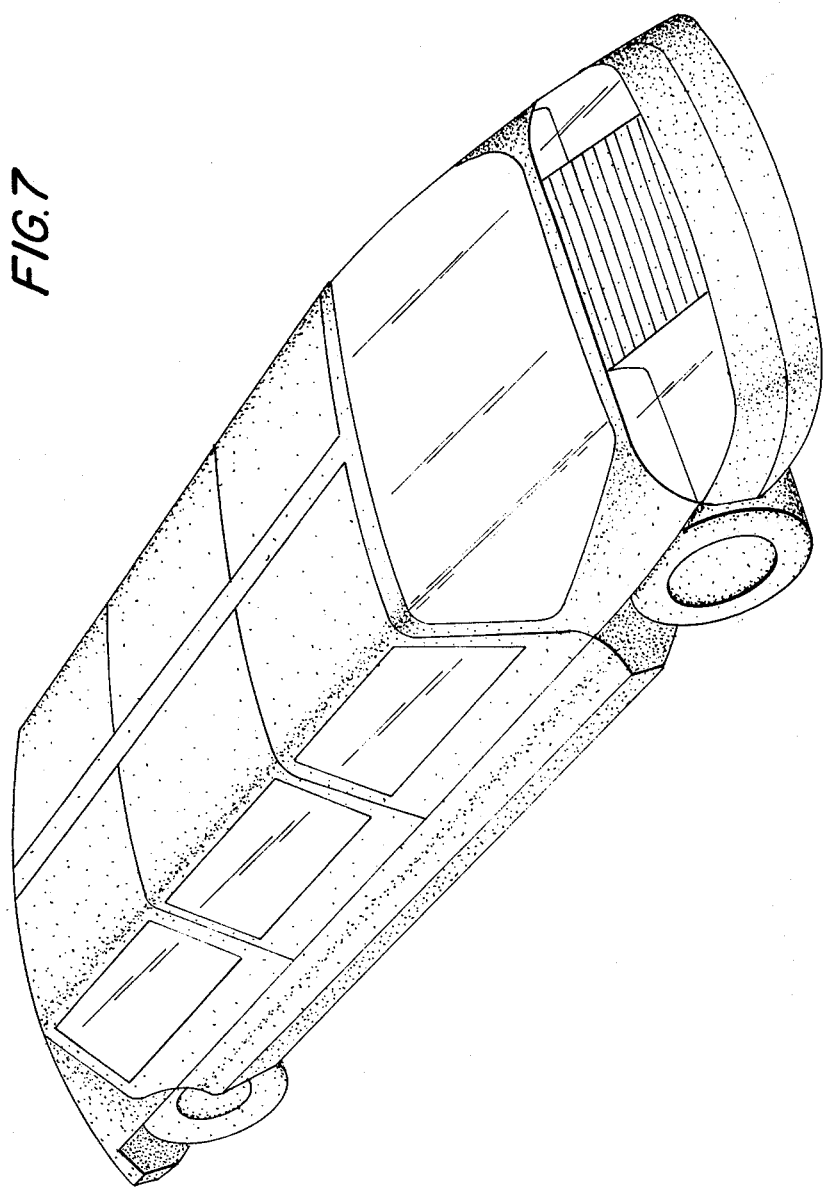
FIG. 7 is a top view of a vehicle envelope construction according to a preferred embodiment of the invention.

FIG. 7 illustrates further how the envelope construction of the instant invention comprises an extremely elongated vehicle having a substantially flat upper and lower surface with a front and rear sub-assembly structure which continues a particularly efficient streamline design. According to the teachings of the instant invention the provision of the central truss allows for minimization of aerodynamic drag by a purposefully contoured envelope configuration which includes an inclined frontal section defined essentially by an inclined plane from the front bumper support 52 and continued by the continuous inclined line defined by the front sill sub-assembly 52 and the windshield line 80. It can be appreciated that the overall configuration of the vehicle according to the principles of the instant invention may provide for an uninterrupted inclined surface for the front end which meets a substantially horizontal roof configuration primarily defined by the top of the meridional truss element 2. This frontal wedge configuration is continued at the rear of the vehicle through the intersection of the central strut element 2 and with its intersection with substantially straight inclined rear configuration strut 38. As a result the instant invention further contemplates a vehicle having particularly low aerodynamic drag to further enhance the attainment of maximum gas mileage through the provision of a overall configuration that minimizes external drag characteristics on the outer surfaces of the vehicle envelope.

While the invention has been illustrated by specific embodiments, it is to be understood that the invention is defined and solely limited by the appended claims.

I claim:

1. A vehicle body frame and envelope construction for an elongated wheelbased vehicle of relatively narrow track having an aspect ratio for wheelbase to track of between approximately 2:1 and 3:1 comprising:
   A. longitudinal frame means between points of attachment for a front wheel assembly and a rear wheel assembly, said points defining said vehicle wheelbase, and
   B. transverse frame means between and encompassing wheel mounting positions on each of said front rear wheel assemblies, said positions defining said vehicle track,
   C. wherein said longitudinal frame means further comprises a central truss member means extending longitudinally between said wheel assembly attachment points wherein said central truss member means is symmetrically between said wheel mounting positions and extends vertically through a passenger compartment to further define an upper roof support for said vehicle body, wherein said central truss member means further comprises an upper longitudinal strut defining said roof support and a bottom longitudinal strut defining the bottom of said vehicle frame, said struts being vertically interconnected by respective vertical struts at spaced longitudinal positions along said longitudinal struts.

2. A vehicle body frame and envelope construction according to claim 1 wherein said central truss member means further comprises further respective diagonal struts extending through said passenger compartment from sid bottom longitudinal strut to said top longitudinal strut within said spaced positions along said longitudinal struts.

3. A vehicle body frame and envelope construction according to claim 2, wherein said respective vertical struts and said respective diagonal struts are mutually interconnected with said upper and lower longitudinal struts to form said central truss as a triangulated interconnection of said longitudinal upper and lower struts, said respective vertical struts and said diagonal struts.

4. A vehicle body frame and envelope construction according to claim 1, wherein said longitudinal frame means further comprise tubular aluminum strut members.

5. A vehicle body frame and envelope construction according to claim 4, wherein said transverse frame means further comprises tubular aluminum pillars.

6. A vehicle body frame and envelope construction according to claim 2, wherein said longitudinal frame means further comprise tubular aluminum strut members.

7. A vehicle body frame and envelope construction according to claim 1, wherein said longitudinal frame means further comprises a forward frame subassembly, said forward subassembly including forward diagonal struts extending downwardly from a forward end of said central truss means and including at its downward end a front sill subassembly attached thereto.

8. A vehicle body frame and envelope construction according to claim 7, wherein said forward diagonal struts and said front sill subassembly comprise a substantially flat wedge configuration having a horizontal leading edge which is substantially in the plane of the bottom of said central truss member means.

9. A vehicle body frame and envelope construction according to claim 8, wherein the leading edge of the top of said central truss member defining said roof support further lies substantially in the plane of said substantially flat front wedge configuration.

10. A vehicle body frame and envelope construction according to claim 9, wherein said transverse frame means further comprises a forward transverse roof pillar extending substantially in said plane of said front wedge, said forward roof pillar being substantially U-shaped and interconnected at its distal ends with a transverse windshield pillar which interconnects with said forward diagonal struts.

11. A vehicle body frame and envelope frame construction according to claim 7, wherein said longitudinal frame means and said transverse frame means further comprise tubular aluminum.

12. A vehicle body frame and envelope frame construction according to claim 8, wherein said longitudinal frame means and said transverse frame means further comprise tubular aluminum.

13. A vehicle body frame and envelope frame construction according to claim 9, wherein said longitudinal frame means and said transverse frame means further comprises tubular aluminum.

14. A vehicle body frame and envelope frame construction according to claim 10, wherein said longitudinal frame means and said transverse frame means further comprise tubular aluminum.

15. A vehicle body frame and envelope construction according to claim 8, wherein said longitudinal frame means further comprises a rear frame subassembly defining a substantially flat wedge configuration having a horizontal trailing edge substantially in the plane of the bottom of said central truss member means.

16. A vehicle body frame and envelope construction according to claim 5, wherein said tubular aluminum pillars further include at least one integrally formed extending flange operable for mounting body panels to further define said vehicle envelope.

17. A vehicle body frame and envelope construction according to claim 2, wherein said transverse frame means further comprises substantially U-shaped roof pillars interconnected with said upper longitudinal strut at their respective middle portions.

18. A vehicle body frame and envelope construction according to claim 17, wherein said U-shaped roof pillars are interconnected with said upper longitudinal strut at said spaced longitudinal positions.

19. A vehicle body frame and envelope construction according to claim 18, wherein said U-shaped roof pillars are substantially perpendicular to said central truss.

20. A vehicle body frame and envelope construction according to claim 19, wherein the distal ends of said respective U-shaped roof pillars are interconnected with longitudinal sidesill members to therebetween define door openings into said vehicle body.

21. A vehicle body frame and envelope construction according to claim 20, wherein said sidesill members lie substantially in a horizontal plane including said bottom longitudinal strut of said central truss member.

* * * * *